United States Patent
Garrett et al.

[15] 3,676,359
[45] July 11, 1972

[54] CHEMICAL SEA SURFACE MARKER

[72] Inventors: William D. Garrett, Washington, D.C.; William R. Barger, Jr., Landover, Md.

[73] Assignee: The United States of America as represented by the Secretary of the Navy

[22] Filed: Oct. 14, 1970

[21] Appl. No.: 80,763

[52] U.S. Cl. ................. 252/301.3 R, 252/301.2 R, 252/408
[51] Int. Cl. ........................................ C09k 1/02, C09k 3/00
[58] Field of Search ................. 252/301.2 R, 408, 301.3 R

[56] References Cited

UNITED STATES PATENTS

| | | | |
|---|---|---|---|
| 2,953,530 | 9/1960 | Switzer | 252/301.2 R |
| 3,297,585 | 1/1967 | Hayden | 252/301.2 R |
| 3,429,826 | 2/1969 | Alburger | 252/301.2 R |
| 2,387,244 | 10/1945 | Compton et al. | 252/408 |
| 2,783,209 | 2/1957 | Pessel | 252/301.3 R |

Primary Examiner—Robert D. Edmonds
Attorney—R. S. Sciascia, Arthur L. Brannings and James G. Murray

[57] ABSTRACT

Surface-active monomolecular films are used in conjunction with fluorescent dyes to provide sea surface markers having greater visibility at all angles for longer periods of time than prior art dye markers.

2 Claims, No Drawings

3,676,359

CHEMICAL SEA SURFACE MARKER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention relates to novel sea markers used in locating submerged and floating objects at sea and in charting currents and water direction in bodies of water. In particular, this invention relates to thin layers of water-insoluble organic compounds in combination with standard sea surface dye markers.

2. Description of the Prior Art

The number of fluorescent dyes that dissolve sufficiently and fluoresce intensely under the excitation of daylight is comparatively small. If color was the only consideration involved, a yellow or yellow-green color would be best since the human eye is most sensitive to light in that wavelength. However, the intensity of the light given off and the contrast with the color of the water are important.

Insoluble pigments, alone, for coloring the water has not, up to this time, been completely satisfactory. If the pigment particles are coarse, they settle too rapidly in the water under the action of gravity. If they are too fine, they are difficult to preserve in fine powder form prior to use due to the tendency to agglomerate and cake-up. Some colored materials may be too soluble in water and thereby become too diluted and undetectable.

Many fluorescent dyes are unsuitable because their color is dependent on the selective absorption of transmitted light. As the dye must be viewed from above the water, and as no light is available for transmission from the bottom of the ocean up through the layer of dyed water, they will appear as dark areas of low visibility. Additionally, unless extremely large amounts of the dyes are used, the area covered will be relatively small and unnoticeable from distances. Also, unless some agent is used to inhibit the unlimited spreading of the dyes, they will readily disperse and become undetectable even under mild wind and wave action.

OBJECTS OF THE INVENTION

Accordingly, it is an object of the present invention to provide visual indicator compositions that will spontaneously spread over water into large coherent areas and become detectable from long distances at all viewing angles.

In addition, it is a further object of this invention to provide visual indicator compositions that are stable in water and will not readily disperse even under rough wind and water conditions. Still another object of the present invention is to provide a water-insoluble thin film which will indicate the position of floating or submerged objects and will indicate the direction of water currents.

Other objects and advantages of this invention will become further apparent from a reading of the follow description thereof.

SUMMARY OF THE INVENTION

The realization and attainment of the above objects of the invention are accomplished by combining the high visibility advantages of a fluorescent dye with the ability of certain surface-active chemicals to spontaneously spread into coherent thin films over the surface of water. The invention is a visual indicating composition comprising a surface-active chemical and a sea surface dye marker which may be included together or separately in dispersing units for disseminating the composition onto a body of water.

DESCRIPTION OF THE PREFERRED EMBODIMENTS

The visual indicating compositions of the present invention comprise relatively water-soluble fluorescent dyes in admixture with surface-active agents such as liquid fatty alcohols, liquid esters or liquid ethers made from the higher fatty acids combined with polyethylene glycols, polyoxyethylenes, sugars, or sugar derivatives. Representative of the fluorescent dyes useful in this invention are the rhodamine dyes such as Rhodamine 7B and Rhodanine 6G. Numerous other dyes may be employed such as Pentacyl Brilliant Pink B, fluoresein, sodium fluorescein, or other salts of fluorescein Brilliant Sulfoflavine FF, Genacryl Orange G, Genacryl Orange R, Genacryl Red 6B, Genacryl Yellow 3G, Genacryl Yellow 5G and the like. Virtually any dye that is suitable for use as a sea surface dye marker would be suitable for use in this invention.

Preferred surface-active agents are polyoxyethylene alkyl ethers, polyethylene glycol esters of fatty acids having 12 to 18 carbon atoms, sorbitan esters of fatty acids, and liquid fatty alcohols. These compounds are especially suitable because they are liquids at low temperatures, have low solubility in water, and have high spreading pressures. They rapidly spread over the surface of water into thin films but remain as continuous coherent films even under adverse wind and wave conditions. They also exhibit wave damping characteristics and may be likened to an artificial sea slick. Illustrative of the above preferred surface-active agents useful in this invention with their respective spreading pressures, are those shown in the following Table.

TABLE

| Surface-Active Agent | Spreading Pressure at 25°C in dynes/cm |
| --- | --- |
| sorbitan trioleate | 37 |
| sorbitan monooleate | 41 |
| lauryl alcohol | 41 |
| sorbitan monolaurate | 43 |
| sorbitan dilaurate | 38 |
| sorbitan pelargonate | 41 |
| *POE(4)lauryl ether | 44 |
| POE(6)tridecyl ether | 42 |
| *PEG(400)monooleate | 41 |
| PEG(200)monolaurate | 44 |
| PEG(400)dilaurate | 38 |
| PEG(200)dilaurate | 40 |
| PEG(400)dioleate | 45 |
| oleyl alcohol | 32 |

*POE = polyoxyethylene (number in parenthesis equals number of polyoxyethylene units); *PEG = polyethylene glycol (number in parenthesis equals average M.W. of all oxyethylene groups present)

In formulating the visual indicator composition of the present invention a selected dye may be mixed with the surface-active agent and incorporated into any known dispensing device. Since, under ideal conditions, 100 grams of sorbitan monooleate will spread into a coherent thin film covering about 14 acres of water surface, seldom more than 100 grams of the surface-active agents are needed. A typical composition would contain not less than ten grams of the surface-active agent and a corresponding amount of dye which will adequately color a significant portion of the area covered by the surface-active agent. The dye is suspended somewhat on the water surface and is spread thereover by the action of the surface-active agents. This action continues until the dye, if of the water-soluble type, has completely dissolved into the water. Since the water-soluble dye is coated by the water-insoluble surface-active agent, its rate of dissolution is decreased and the period of visibility is unexpectedly enhanced many times over that of prior art sea surface markers.

Other compounds such as glycerine are frequently added to enhance the stability of the compositions and solvents may be used to provide the desired specific gravity. The dyes are commonly in fine powder form and are occasionally mixed with an anti-settling agent such as copper resinate or magnesium silicate. Seltzer components such as sodium bicarbonate and citric acid may also be used depending on the type of dispensing device being utilized.

If it is desired to chart surface currents, a dispensing device allowing for slow release of dye and surface-active agent may be used. In this instance the compositions of the present invention may be incorporated into molded cakes of substances that will slowly dissolve in water. Other devices may be in the form of porous packages which can be attached to life preservers or can be dropped into the water from aircraft for rescue operations. The surface-active agents and dyes may be in separate packages and mixed on the water surface by the chemical spreading action and natural forces.

The novelty of the present invention lies in the discovery that fluorescent dye marker compounds may be utilized in combination with surface-active chemicals that spread rapidly over the surface of water into coherent substantially monomolecular films. The surface-active films spread over large water surface areas and are highly visible due to their wave-damping characteristics. Because of such wave damping and the greatly enlarged areas that are covered, the dye and film combination is visible at all angles and from greater distances than these known in the prior art. Also, the films are coherent or continuous and are not readily broken-up by winds as great as 20–24 knots. Additionally, the films decrease the rate of dissolution of the dye into the water thereby enhancing the period of visibility.

Although substantially any device may be used to disperse the compositions of the present invention and any manner of solvents, dispersing agents, matrixes, dyes and anti-settling agents can be used, the following field tests conducted in the Chesapeake Bay will serve to illustrate the practice of this invention.

EXAMPLE I

Sodium fluorescein (50 gm) and oleyl alcohol (35 gm) were intimately mixed with 25 gm sodium bicarbonate and 20 gm citric acid into a paste. This paste was placed into a 16-mesh fiber-glass bag made buoyant with styrofoam floats. After two hours in the water, a large circular dye spot emanating from the floating bag was clearly observed visually and photographically from an aircraft flying normal search patterns at 600, 1,000 and 2,000 feet. The water was choppy with 2–3 foot swells and some whitecaps were created by 10–15 mph winds. Under the same conditions, a standard Navy dye packet MIL–S–17980B containing 100 gm sodium fluorescein was completely dispersed to undetectable concentrations in 30–60 minutes.

EXAMPLE II

The same results were obtained under the same conditions listed in Example I using an open-ended cylinder 25 cm long and 2.2 cm I.D. as a dispensing device. In that case 27 gm sorbitan monooleate was used with 50 gm sodium bicarbonate and 42 gm citric acid.

It should be noted that when the surface-active agent is used alone it will be ineffective under calm conditions. Its wave-damping characteristics are what make it detectable and without waves it will be unnoticed. Therefore, the use of a fluorescent dye in conjunction with a surface-active agent produces a visual indicating composition that is visible under substantially any daylight conditions.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A visual indicating composition for use on water comprising:
    not less than 10 grams of oleyl alcohol;
    not less than 10 grams of a fluorescent dye; and,
    a seltzer composition present in an amount sufficient to disperse said dye and oleyl alcohol into said water.

2. A visual indicating composition for use on water comprising:
    not less than 10 grams of sorbitan monooleate;
    not less than 10 grams of a fluorescent dye;
    a seltzer composition present in an amount sufficient to disperse said dye and sorbitan monooleate into said water.

* * * * *